(12) United States Patent
Zaheer et al.

(10) Patent No.: US 11,809,473 B2
(45) Date of Patent: Nov. 7, 2023

(54) LOCATION-BASED VOICE PROCESSING

(71) Applicant: NCR Corporation, Duluth, GA (US)

(72) Inventors: Abdul Khaliq Zaheer, Atlanta, GA (US); Daniel Bassett, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 459 days.

(21) Appl. No.: 15/691,165

(22) Filed: Aug. 30, 2017

(65) Prior Publication Data

US 2019/0065504 A1 Feb. 28, 2019

(51) Int. Cl.
*G06Q 30/0601* (2023.01)
*G06F 16/33* (2019.01)
*G06F 16/338* (2019.01)
*G06F 16/29* (2019.01)
*G06F 16/9032* (2019.01)

(52) U.S. Cl.
CPC ........ *G06F 16/3332* (2019.01); *G06F 16/338* (2019.01); *G06F 16/3344* (2019.01); *G06Q 30/0639* (2013.01); *G06F 16/29* (2019.01); *G06F 16/90332* (2019.01)

(58) Field of Classification Search
CPC ............. G06F 16/3332; G06F 16/3344; G06F 16/338; G06F 16/29; G06Q 30/0639
See application file for complete search history.

(56) References Cited

U.S. PATENT DOCUMENTS

| | | | | |
|---|---|---|---|---|
| 2009/0012704 A1* | 1/2009 | Franco | ................... | G01C 21/20 701/532 |
| 2011/0119298 A1* | 5/2011 | Arrasvuori | .......... | G06F 16/9535 707/769 |
| 2012/0232897 A1* | 9/2012 | Pettyjohn | ........... | G06Q 30/0603 704/235 |
| 2012/0259732 A1* | 10/2012 | Sasankan | .............. | H04W 4/029 705/26.9 |
| 2013/0185150 A1* | 7/2013 | Crum | ..................... | G06Q 30/02 705/14.49 |
| 2014/0156461 A1* | 6/2014 | Lerner | ............... | G06Q 30/0623 705/26.61 |

(Continued)

OTHER PUBLICATIONS

A. Sharp and S. Kurkovsky, "VOICE: A Framework for Speech-Based Mobile Systems," 21st International Conference on Advanced Information Networking and Applications Workshops (AINAW'07), Niagara Falls, ON, Canada, 2007, pp. 38-43, doi: 10.1109/AINAW. 2007.369 (Year: 2007).*

*Primary Examiner* — Lynda Jasmin
*Assistant Examiner* — Ehrin L Pratt
(74) *Attorney, Agent, or Firm* — Schwegman Lundberg & Woessner, P.A.

(57) ABSTRACT

A voice-initiated item search is received along with a current geolocation of a device from which the voice-initiated item search was initiated. The search is translated to text, and the text search and the current geolocation are submitted as a search to locate an enterprise within a configured distance of the current geolocation and to locate a specific location for an item within that enterprise. The enterprise and the specific location for the item are provided back to an operator of the device as search results in voice and/or text. The geolocation represents a location of a consumer and the results provide enterprise specific item-level detail and item-location information for the item within an enterprise location for the consumer to quickly navigate to the item.

17 Claims, 4 Drawing Sheets

(56) References Cited

U.S. PATENT DOCUMENTS

| | | | |
|---|---|---|---|
| 2015/0262120 A1* | 9/2015 | Kulig | G06Q 10/087 |
| | | | 705/28 |
| 2015/0371319 A1* | 12/2015 | Argue | G06Q 30/0633 |
| | | | 705/26.8 |
| 2018/0089316 A1* | 3/2018 | Ganot | G06F 16/289 |
| 2018/0307761 A1* | 10/2018 | Felt | G06F 16/685 |
| 2018/0357236 A1* | 12/2018 | Bundrage | G06Q 30/06 |

* cited by examiner

LOCATION-BASED VOICE PROCESSING

BACKGROUND

A variety of mobile-based services exist in the industry for users and businesses to: obtain information, perform transactions, watch entertainment, and socialize with business associates, friends, and family members.

In large part, these services are text-based interfaces with each service having their own proprietary interface. However, recent technology has permitted voice-based interfaces, such as Google Home®, Amazon Echo®, Apple Siri®, and others. With these voice interfaces, user can now perform many network-based transaction utilizing speech.

SUMMARY

In various embodiments, methods and a system for location-based voice processing are presented.

According to an embodiment, a method for location-based voice processing is presented. More particularly, a voice search for an item is translated to a text search and a current geolocation of a device that initiated the voice search is obtained. Then, the text search with the current geolocation is submitted as a search in an item location database for acquiring search results. Finally, the search results are provided to the device for identifying an item location for the item within an enterprise location for an enterprise.

DETAILED DESCRIPTION

Figure 1:
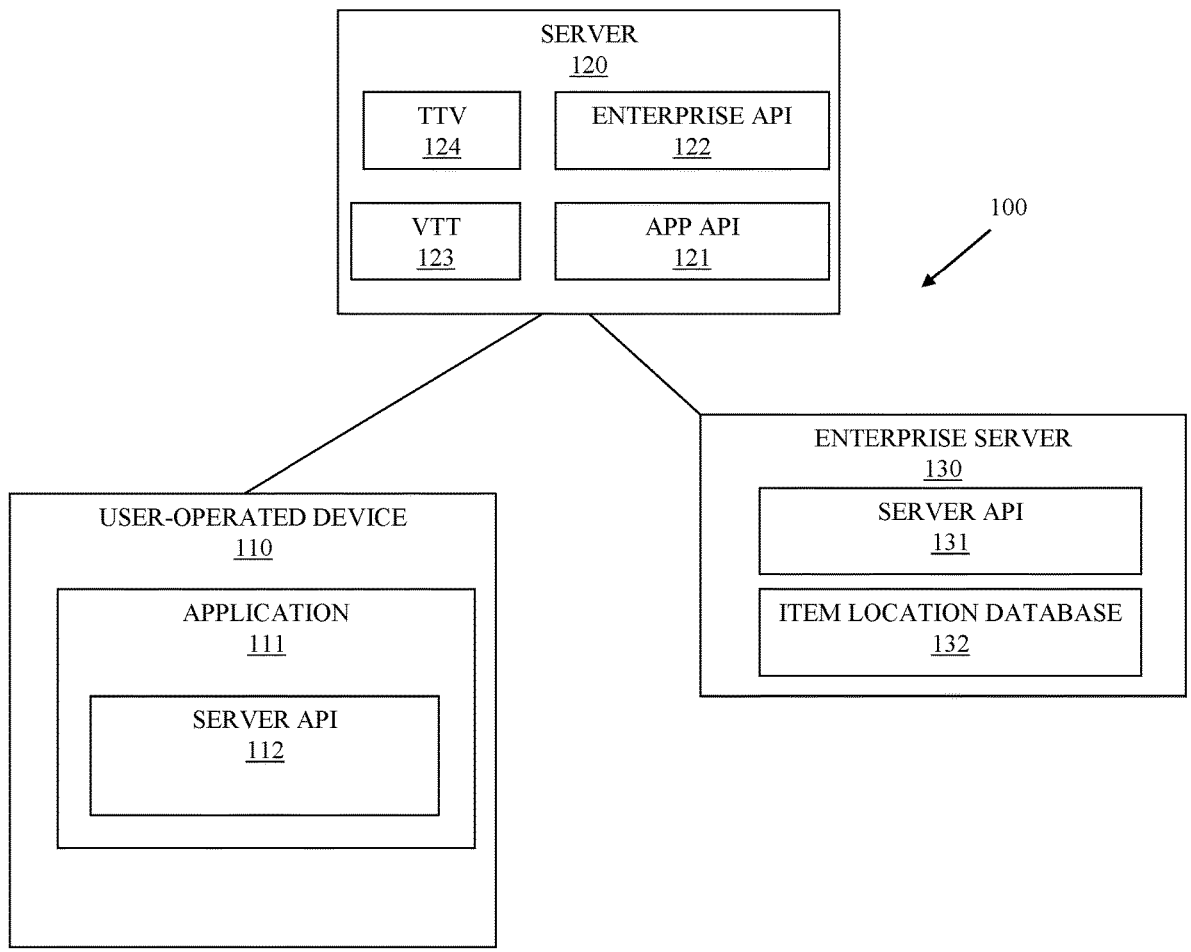
FIG. 1 is a diagram of a system for location-based voice processing, according to an example embodiment.

FIG. 1 is a diagram of a system 100 for location-based voice processing, according to an example embodiment. The various components are illustrated and the arrangement of the components is presented for purposes of illustration only. It is to be noted that other arrangements with more or less components are possible without departing from the location-based voice processing teachings presented herein and below.

The techniques, methods, and system presented herein and below for location-based voice processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

As used herein, the terms "geolocation" and "location" refers to a geographic location of a device or an enterprise.

The system 100 includes: a) a client 110 having an application 111 and a server Application Programming Interface (API) 112; b) a server 120 having an application (app) API 121, an enterprise API 122, a voice-to-text (VTT) service 123, and a text-to-voice (TTV) service 124; and c) an enterprise server 130 having a server API 131 and an item location database 132. The interaction and processing of these components will now be discussed with reference to method presented in the FIG. 1.

The application (app) 111 uses location services available with the Operating System (OS) of the device 110 and regularly reports the device's geolocation through the device's server API 112 to the server's app API 121. A user operates the device 110. The application 111 also includes a user-facing interface for voice and text-based interaction with the server 120 through the server API 112.

This permits the server 120 to have the device's 110 geolocation during any user-initiated interaction through the user-facing interface of the application 111.

The server 120 provides VTT-based interaction to the user through the user-facing interface. The VTT 123 translates the user's voice into text and accesses the enterprise API 122 for communicating text-based searches to the server API 131 of the enterprise server 130 for purposes of searching the item location database 132.

The item location database 132 includes a variety of searchable information, such as but not limited to: item descriptions, item identifiers, store geolocations, item price, item images, store-specific item aisle locations, store-specific item shelf locations, store-specific maps, item review information, item attributes (color, size, brand, warranty, etc.), and other information.

The enterprise API 122 constructs text-based searches that are submitted to the server API 131 for purposes of searching the item location database 132. The searches include the current reported geolocation of the device 110 when a user initiated interaction with the user-facing interface of the application 111. The searches also include item descriptive information that was translated to text by the VTT service 123.

The server API 131 returns search results obtained from searching the item location database 132 to the enterprise API 122. The results for the search (initiated through voice by the user operating device 110) are then communicated back to the application 111 as voice results (through the TTV service 124) and/or through text communicated information through the APP API 121.

The modules 121-124 also permit dynamic feedback through interaction with the user through the application's user-facing interface. The user can refine a search request, modify a search request, clarify a search request, and the like through the dynamic feedback. For example, when the returned search results produce different item-specific locations within a specific store based on an attribute of the item (such as size, color, brand, etc.), the feedback can ask the user to clarify the desired attribute for the item from the available attributes presented in the results from searching the item location database 132.

The modules 121-124 also permit presenting search results to the user through the user-facing interface of the application 111 in a sort order. For example, when an item is located within a specific store in multiple locations, the modules 121-124 can sort the different locations based on a computed distance between the current geolocation of the device 110 and each of the item locations within the enterprise (may also be referred to as "store" herein) with the highest sorted item being the closest to the current geolocation of the device 110 and the lowest sorted item being the farthest from the current geolocation of the device 110. In another case, the sort order can be based on user-registered preferences, such as sort by price, by brand, etc.

As an operation example of the system 100, consider a user desiring to purchase a DeWalt® cordless drill. The user activates the application 111 on the user device 110 and states in voice to the user-facing interface "where are the DeWalt® cordless drills." The server API 112 accesses the device's location service and reports the device's geolocation to the APP API 121. The server API 112 passes the voice data to the VTT service 123. The enterprise API 122 passes the device's geolocation and the text translated voice search provided by the VTT service 123 as a search to the server API 131. The server API 131 searches the item location database 132 and identifies a specific store's geolocation where the device 110 is currently located and identifies the DeWalt® cordless drills as being in aisle 20 on a multiple different shelves within aisle 20. The text search results are passed by the server API 131 to the enterprise API 122. The APP API 121 then accesses the TTV service 124 to translate the text search results to voice and provides voice search results to the application 111 and/or provides the text search results to the application 111. Furthermore, because the drills are on multiple shelves within aisle 20, the feedback processing may request the user to clarify what size of drill is desired to further refine the search request. This feedback loop is dynamical and can be controlled by the user through the user-facing interface of the application 111.

In an embodiment, the application 111 may also include navigation functionality that presents a map of the store where the device 110 is located along with the current geolocation of the device 110 pinned on the map and navigation instructions for dynamically navigating the user from the current geolocation of the device 110 to a specific aisle and location within an aisle of a store where the user can find a requested item. The navigation instructions can include voice guidance and/or text-based instructions for navigating the user to the requested item within the store.

In an embodiment, the modules 121-124 permit feedback clarification when the current geolocation of the device 110 is determined to be within a configured and predefined distance of multiple enterprises that have a desired item communicated by the user in a voice-based search through the user-facing interface of the application 111. For example, suppose that the device 110 is determined to be in a food court of a mall or in a parking lot and the drills desired by the user are in multiple nearby locations. The feedback may ask the user when enterprise the user desires to find the item first and then provide the specific micro-level location for the item within the selected enterprise. In an embodiment, as presented above, when multiple choices are available from the search results for the desired time, the feedback can sort those choices before presenting to the user (through voice and/or text).

In an embodiment, the server 120 includes item location searching and guidance for a plurality of different enterprises (retailers) and the stores associated with each enterprise. The same enterprise API 122 may be processed for each of the different enterprises to access their individual item location databases 132. Alternatively, the server 120 includes multiple different enterprise APIs 122 with each different enterprise API 122 configured for searching an item database 132 of a specific enterprise.

In an embodiment, the VTT service 123 and the TTV service 124 is an externally linked third-party service that the server 120 has an API for accessing for purposes of translating text to voice and voice to text. In this way, the functionality of 123 and 124 can be leveraged from existing TTV and VTT services as plugins to the server 120.

In an embodiment, the VTT and TTV functionality is subsumed within the application 111, such that the device 110 provides the processing of converting between text and voice and there is no need to pass audio data over a network connection between the device 110 and the server 120. In an embodiment, the VTT and TTV processing is provided as a plugins to the application 111.

In an embodiment, the processing of the server 120 is subsumed within a specific enterprise server 130, such that there is just a single enterprise server 130 providing the functionality of the system 100.

In an embodiment, the device 110 is one of: a wearable processing device, a phone, a laptop, a tablet, and a device that is integrated into or affixed to a vehicle.

In an embodiment, the server 120 is part of a cloud processing environment and is a collection of servers that logically cooperate as a single server 120.

In an embodiment, the enterprise server 130 is part of a cloud processing environment and is a collection of servers that logically cooperate as a single server 130.

In an embodiment, the functionality of the system 100 is provided as a Software-as-a-Service (SaaS) to the device 110.

One now appreciates how voice-based interaction can be geolocation specific for purposes of providing a user with micro-level item location information within a specific store. Micro-level is intended to mean a specific location within a specific enterprise including aisle location information for a specific aisle, shelf location within a specific aisle, and/or location of an item within the specific aisle and shelf. In fact, in some embodiments, the exact location of the item can pinned on a physical layout map of a specific enterprise and/or navigation instructions are provided as voice and/or text for navigating the user to the desired item.

The processing of the system also highlights how the location of a consumer (through determination of a geolocation of a consumer's device) and the specific item-level detail for an item within a store location can be processed an item level-detail and location database to provide the consumer dynamic and real-time guidance to a specific desired item within the store from the current location of the consumer. This is of import because most consumers struggle to find items within a store especially when the store carries a large number of items such as superstores and grocery stores.

These embodiments and other embodiments are now discussed with reference to the FIGS. 2-4.

Figure 2:
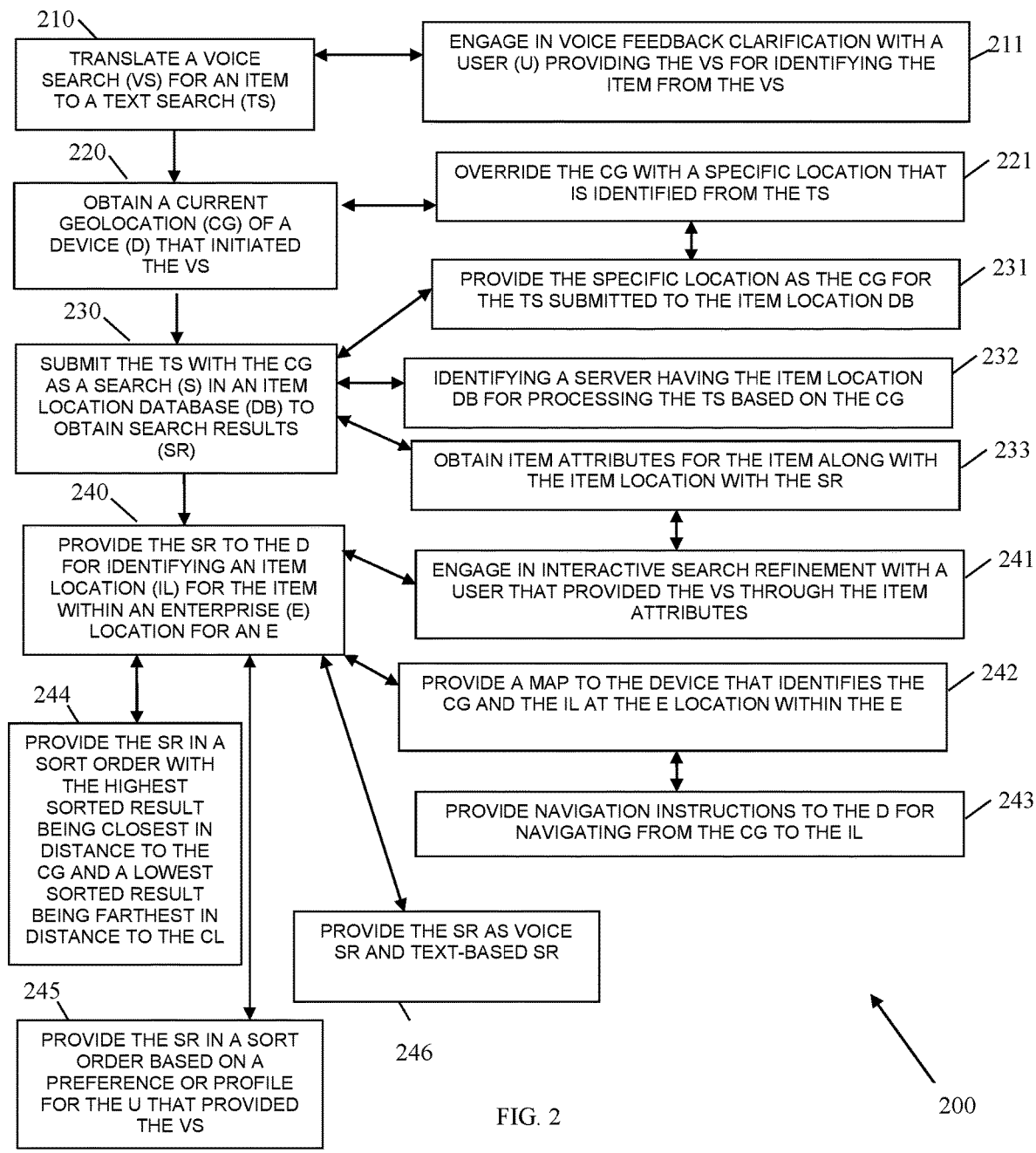
FIG. 2 is a diagram of a method for location-based voice processing, according to an example embodiment.

FIG. 2 is a diagram of a method for location-based voice processing, according to an example embodiment. The software module(s) that implements the method 200 is referred to as a "voice-based item location manager." The voice-based item location manager is implemented as executable instructions programmed and residing within memory and/or a non-transitory computer-readable (processor-readable) storage medium and executed by one or more processors of a device. The processor(s) of the device that executes the voice-based item location manager are specifically configured and programmed to process the voice-based item location manager. The voice-based item location manager has access to one or more networks during its processing. The networks can be wired, wireless, or a combination of wired and wireless.

In an embodiment, the voice-based item location manager is all or some combination of the modules 121-124.

In an embodiment, the device that executes the voice-based item location manager is the server 120.

In an embodiment, the device that executes the voice-based item location manager is a plurality of servers logically organized as a cloud processing environment.

At 210, the voice-based item location manager translates a voice search for an item to a text search. The voice search initiated from a user that is operating a device, such as any of the devices 110 discussed above with the FIG. 1, and the user interacting with a user-facing interface of application 111.

According to an embodiment, at 211, the voice-based item location manager engages in voice-feedback clarification with the user who provided the voice search for identifying the item from the voice search.

At 220, the voice-based item location manager obtains a current geolocation of the device being operated by the user. In an embodiment, the current geolocation is obtained from location-based services provided by the OS of the device and is reported to the voice-based item location manager through the server API 112.

In an embodiment, at 221, the voice-based item location manager overrides the current geolocation with a specific location that is identified from the text search. That is, the user may indicate a specific store location that the user wants to find the item location at. In this embodiment, the user may be at any physical distance from the specific store location. This allows the user to override the automatically reported geolocation of the device.

At 230, the voice-based item location manager submits the text search with the current geolocation as a search for processing against an item location database for obtaining search results.

In an embodiment of 230 and 221, the voice-based item location manager provides the specific location (overridden in the voice search that was translated to the text search) with the specific location that was identified in the text search.

In an embodiment, at 232, the voice-based item location manager identifies a server having the item location database for processing the text search based on the current geolocation. That is, the voice-based item location manager may have the ability to search multiple different item location databases with each database being associated with a specific retailer and a specific server of that retailer. The current geolocation can be processed by the voice-based item location manager against a lookup table for identifying the server needed for conducting the text search.

In an embodiment, at 233, the voice-based item location manager obtains item attributes for the item along with the item location with the search results.

In an embodiment, the item database discussed in the above-noted embodiments is the item database 131 and includes any of the data and attributes discussed above with the FIG. 1.

At 240, the voice-based item location manager provides the search results to the device being operated by the user for identifying a specific item location for the item within an enterprise (retailer) location for an enterpriser.

In an embodiment of 233 and 240, at 241, the voice-based item location manager engages in interactive search refinement with the user that provided the voice search through the item attributes.

In an embodiment, at 242, the voice-based item location manager provides an interactive map to the device that identifies the current geolocation and the item location at the enterprise location within the enterprise. This item location is a micro location as discussed above with the FIG. 1 (fine grain within a store and not coarse grain).

In an embodiment of 242 and at 243, the voice-based item location manager provides navigation instructions to the device for navigating from the current geolocation to the item location within the enterprise location.

In an embodiment, at 244, the voice-based item location manager provides the search results in a sort order with the highest sorted result being closest in distance to the current geolocation and the lowest sorted result being farthest in distance to the current geolocation based on the item location and the current geolocation.

In an embodiment, at 245, the voice-based item location manager provides the search results in a sort order based on a preference or profile for the user that provided the voice search initially.

In an embodiment, at 246, the voice-based item location manager provides the search results as voice search results and text-based search results.

In an embodiment, the voice-based item location manager provides the search results as just text-based search results.

Figure 3:
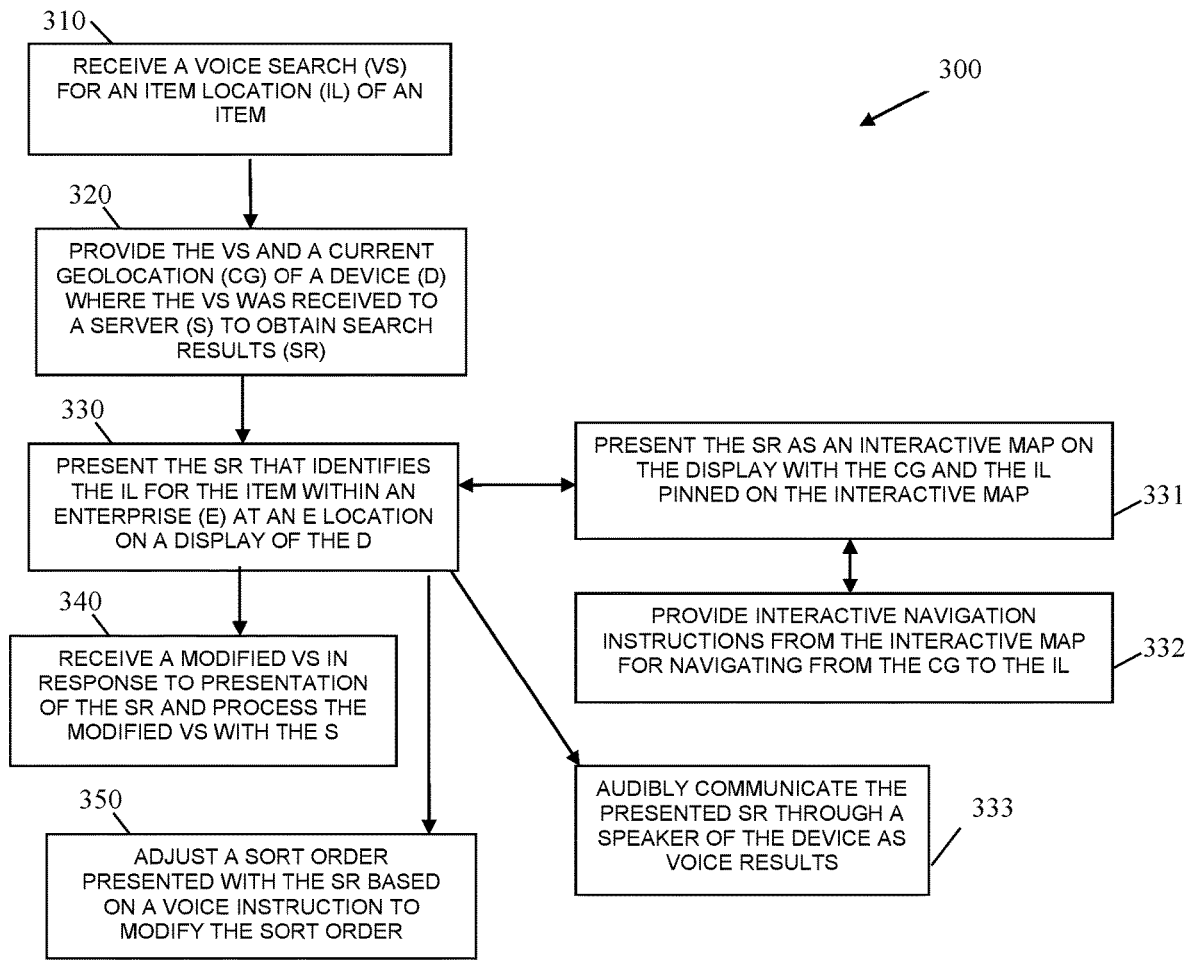
FIG. 3 is a diagram of another method for location-based voice processing, according to an example embodiment.

FIG. 3 is a diagram of another method for location-based voice processing, according to an example embodiment. The software module(s) that implement the method 300 is referred to herein as a "voice-item location interface." The voice-item location interface is implemented as executable instructions and programmed within memory and/or a non-transitory computer-readable (processor-readable) storage medium that executes on one or more processors of a device. The processors of the device are specifically configured to execute the voice-item location interface. The voice-item location interface has access one or more networks; the networks can be wired, wireless, or a combination of wired and wireless.

In an embodiment, the voice-item location interface is all or some combination of the application 111 and/or server API 112.

In an embodiment, the device that executes the voice-item location interface is the device 110.

In an embodiment, the device that executes the voice-item location interface is one of: a wearable processing device, a tablet, a phone, a laptop computer, a computer-based device integrated into or attached to a vehicle.

The voice-item location interface interacts with the voice-based item location manager described above as the method 200 of the FIG. 2.

At 310, the voice-item location interface receives a voice search for an item location of an item.

At 320, the voice-item location interface provides the voice search and a current geolocation of a device where the voice search was received to a server (such as the server 120 and/or the server executing the method 200) to obtain search results.

At 330, the voice-item location interface presents the search results that identifies the item location for the item within an enterprise at an enterprise location on a display of the device.

According to an embodiment, at 331, the voice-item location interface presents the search results as an interactive and touch-sensitive map on the display with the current geolocation and the item location pinned on the interactive map.

In an embodiment of 331 and at 332, the voice-item location interface provides interactive navigation instructions for the interactive map for navigating from the current geolocation to the item location.

In an embodiment, at 333, the voice-item location interface audibly communicates the presented search results through a speaker of the device as voice results.

According to an embodiment, at 340, the voice-item location interface receives a modified voice search in response to the presentation of the search results. In response, the voice-item location interface processes the modified voice search with the server at 320.

In an embodiment, at 350, the voice-item location interface adjust a sort order with the search results based on a voice instruction to modify the sort order.

Figure 4:
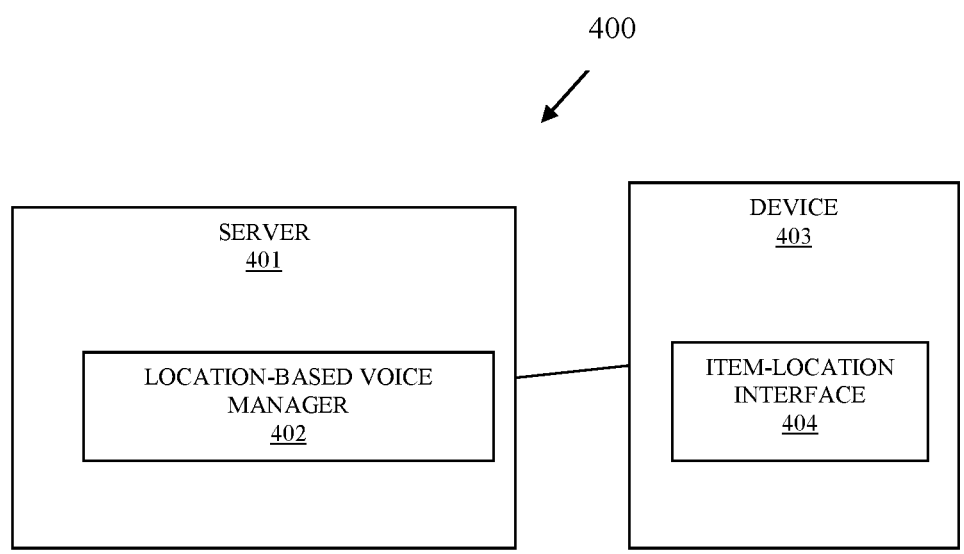
FIG. 4 is a diagram of another system for location-based voice processing, according to an example embodiment.

FIG. 4 is a diagram of another system 400 for location-based voice processing, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programed to perform the processing discussed above with the FIGS. 1-3.

The system 400 includes a server 401 having a security location-based voice manager 402 and a device 403 having an item-location interface 404.

In an embodiment, the server 401 is the server 120.

In an embodiment, the server 401 is a part of a cloud processing environment.

In an embodiment, the device 403 is the device 110.

In an embodiment, the device 403 is one of: a wearable processing device, a tablet, a phone, a laptop computer, and a computer-enabled device integrated into or affixed to a vehicle.

In an embodiment, the location-based voice manager 402 is all of or some combination of: the modules 121-124 and/or the method 200.

In an embodiment, the item-location interface 404 is all of or some combination of: the application 111, the server API 112 and/or the method 300.

The item-location interface 404 executes on the device 403 and is configured to: i) connect to the server 401 and provide a voice search for an item location of an item and a current geolocation of the device 403 to the location-based voice manager 402 and ii) communicate the item location from the device 401 with search results received from the location-based voice manager 402.

In an embodiment, the item-location interface 404 performs some or all of the processing discussed above for the application 111, the server API 112, and/or the method 300.

The location-based voice manager 402 executes on the server 401 and is configured to: i) translate the voice search to a text search, ii) search an item location database with the current geolocation and the text search to obtain the search results, and iii) provide the search results to the item-location interface 404.

In an embodiment, the search results are provided as voice results.

In an embodiment, the search results are provided as text results.

In an embodiment, the search results are provide as both voice results and text results.

In an embodiment, the location-based voice manager 402 performs some or all of the processing discussed above for the modules 121-124 and/or the method 200.

It should be appreciated that where software is described in a particular form (such as a component or module) this is merely used to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method, comprising:
providing executable instructions to a hardware processor of a server from a non-transitory computer-readable storage medium causing the hardware processor to perform processing, comprising:
  translating a voice search for an item to a text search by using a first aft Application Programming Interface (API) and interfacing with a voice-to-text plugin service accessible from the server as an externally-linked third-party service of the server using a second API, wherein translating further includes receiving the voice search, through the first API, from a user-facing interface of an application that executes on a device operated by a user;
  obtaining a current geolocation of the device that initiated the voice search from the application, wherein the application obtains the current geolocation from an operating system (OS) of the device and regularly reports the current geolocation for the device to the server, wherein obtaining further includes matching the current geolocation to a store location associated with a store where the user is located when the voice search was provided through the application;
  submitting the text search with the current geolocation as a search in an item location database maintained by an enterprise server that is associated with the store using a third API to submit the text search and to obtain search results for the text search from the item location database, wherein the item location database comprises for each store item: an item description, an item identifier, a store geolocation, an item price, an item image, store-specific item aisle locations, store-specific item shelf locations, store-specific maps, item review information, and item attributes for the corresponding store item;
  identifying multiple locations within the store associated with the current geolocation of the device for the item from the search results, wherein identifying further includes identifying a specific aisle location for the item and a specific shelf location for the item within the aisle for each multiple location;

sorting the multiple locations for the item based on computed distances between the current geographical location of the device with each of the multiple locations within the store;

selecting an item location associated with being in a particular location within the store that is closest to the current geographical location of the device based on the sorting;

providing the search results with the item location to the device using the first API, wherein providing further includes providing the item location and the search results as voice search results using the second API to obtain the voice search results from a text-to-voice plugin service associated with the externally-linked third-party service based on text-based search results for the search results and providing the voice search results to the application through the first API and further providing the item location and the search results as the text-based search results to the application using the first API, and wherein the search results comprise the multiple locations and the item location selected for the item within the store, wherein providing further includes requesting voice clarification from the user to provide attributes of the item when the multiple locations are associated with the item having different attributes at the item location and remaining ones of the multiple locations, and providing a closest corresponding item location for the item from the multiple locations first in the search results based on the voice clarification when the item location changes because of the voice clarification and when the item locations does not change because of the voice clarification making the closest corresponding item location be the item location;

causing the user-facing interface, through the first API, to present a map of the store with the closest corresponding item location pinned on a physical layout of the store within the map and further causing the user-facing interface, through the first API, to provide both voice and text navigation within the user-facing interface from the current geolocation of the device to the closest corresponding item location; and processing the executable instructions from the server as a Software-as-a Service (SaaS) to the to the device operated by the user.

2. The method of claim 1, wherein translating further includes engaging in voice feedback clarification with the user providing the voice search for identifying the item from the voice search.

3. The method of claim 1, wherein obtaining further includes overriding the current geolocation with a specific location that is identified from the text search.

4. The method of claim 3, wherein submitting further includes providing the specific location as the current geolocation for the text search submitted to the item location database.

5. The method of claim 1, wherein submitting further includes identifying a server having the item location database for processing the text search based on the current geolocation.

6. The method of claim 1, wherein submitting further includes obtaining item attributes for the item along with the item location with the search results.

7. The method of claim 6, wherein providing further includes engaging in interactive search refinement with the user that provided the voice search through the item attributes.

8. The method of claim 1, wherein causing further includes providing navigation instructions to the device for navigating from the current geolocation to the closest corresponding item location.

9. The method of claim 1, wherein providing further includes providing the search results in a sort order based on a preference or profile for the user that provided the voice search.

10. A computer-implemented method, comprising:

providing executable instructions to a hardware processor from a non-transitory computer-readable storage medium causing the hardware processor to perform processing, comprising:

receiving, through a first application programming interface (API) a voice search for an item location of an item from a user-facing interface of an application that executes on a device operated by a user;

obtaining a current geolocation of the device from an operating system (OS) of the device;

providing, through a second API, the voice search and the current geolocation of the device where the voice search was received to a server to obtain search results from an item location database maintained by an enterprise server for a store location of a store that correlates with the current geolocation of the device, wherein the item location database comprises for each store item: an item description, an item identifier, a store geolocation, an item price, an item image, store-specific item aisle locations, store-specific item shelf locations, store-specific maps, item review information, and item attributes for the corresponding store item;

regularly receiving updates to the current geolocation from the OS as the device travels within the store and reporting the updates for the current geolocation to the server;

identifying multiple locations within the store associated with the current geolocation of the device for the item from the search results, wherein identifying further includes identifying a specific aisle location for the item and a specific shelf location for the item within the aisle for each multiple location;

sorting the multiple locations for the item based on computed distances between the current geographical location of the device with each of the multiple locations within the store;

selecting the item location associated with being in a particular location within the store that is closest to the current geographical location of the device based on the sorting;

presenting the search results that identifies the item location for the item within the store on a display of the device, wherein presenting further includes also presenting the search results in a sort order based on the computed distances between the current geolocation of the device to corresponding item locations associated with the search results within the store with a corresponding closest item location listed first in the sort order as the item location, wherein presenting the search results in the sort order further includes requesting voice clarification from the user to provide attributes of the item based on the multiple locations for the item within the store and providing the corresponding closest item location for the item first in the search results based on the voice clarification when the corresponding closest item location changes from the item location to a different one of the multiple locations, wherein presenting further includes causing the user-facing interface to present a map of the store with the closest corresponding item location pinned on a physical layout of the store within the map and further causing the user-facing interface to provide both voice and text navigation within the user-facing interface from the current geolocation of the device to the closest corresponding item location; and interacting with the service as a Software-as-a-Service from the device.

11. The method of claim 10 further comprising, receiving a modified voice search in response to presenting the search results and processing the modified voice search with the server.

12. The method of claim 10 further comprising, adjusting the sort order presented with the search results based on a voice instruction to modify the sort order.

13. The method of claim 10, wherein presenting further includes presenting the search results as an interactive map on the display with the current geolocation and the item locations pinned on the interactive map.

14. The method of claim 13, wherein presenting further includes providing interactive navigation instructions from the interactive map for navigating from the current geolocation to each of the item locations.

15. The method of claim 10, wherein presenting further includes audibly communicating the presented search results through a speaker of the device as voice results.

16. A system, comprising:
a server comprising a hardware processor and a non-transitory computer-readable storage medium comprising executable instructions representing a location-based voice manager; and
a device comprising a device processor and a device non-transitory computer-readable storage medium comprising executable instructions representing an item-location interface;
the item-location interface executed by the device processor from the device non-transitory computer-readable storage medium causing the device processor to:
provide a user-facing interface to a user that operates the device through an application that executes on the device;
obtaining a current geolocation of the device from an operating system (OS) of the device;
connect to the server and provide a voice search for an item location of an item and a current geolocation of the device to the location-based voice manager using the user-facing interface and a first application programming interface (API);
regularly receiving updates to the current geolocation from the OS as the device travels and reporting the updates for the current geolocation to the server;
communicate the item location from the device with search results received from the location-based voice manager through the user-facing interface and the first API;
receive navigation instructions and a map from the location-based search manager through the first API; and
present the map of a store associated with on the display through the user-facing interface with a closest corresponding item location pinned on a physical layout of the store within the map and provide both voice and text navigation within the user-facing interface from the current geolocation of the device to the closest corresponding item location the location-based search manager executed by the hardware processor from the non-transitory computer-readable storage medium causing the hardware processor to:
translate the voice search to a text search by using a second API and interfacing with a voice-to-text plugin service accessible from the server, wherein the voice-to-text plugin service is an externally-linked third-party service of the server;
search an item location database maintained by an enterprise server that is associated with the store with the current geolocation and the text search to obtain the search results using a third API by submitting the text search to the item location database of the enterprise server and obtaining the search results back from the item location database, wherein the item location database comprises for each store item: an item description, an item identifier, a store geolocation, an item price, an item image, store-specific item aisle locations, store-specific item shelf locations, store-specific maps, item review information, and item attributes for the corresponding store item;
identify multiple locations within the store associated with the current geolocation of the device for the item from the search results, wherein identify further includes identify a specific aisle location for the item and a specific shelf location for the item within the aisle for each multiple location;
sort the multiple locations for the item based on computed distances between the current geographical location of the device with each of the multiple locations within the store;
select the item location associated with being in a particular location within the store that is closest to the current geographical location of the device based on the sorting;
provide the search results to the item-location interface using the first API in a sort order based on distances between the current geolocation of the device to corresponding item locations associated with the search results within the store with a corresponding closest item location being the item location listed first in the sort order, and wherein voice clarification is requested from the user to provide attributes of the item based on the multiple locations for the item being associated with the item within the store and provide the corresponding closest item location for the item first in the sort order for the search results based on the voice clarification when the closest item location changes from the item location based on the voice clarification, wherein the voice clarification is provided to the voice-to-text plugin service using the second API and text clarifications are received from the voice-to-text plugin service, wherein the text clarifications are processed to provide the corresponding closest item location for the item in the store order to the item-location interface using the first API;
provide the map and the navigation instructions to the item-location interface using the first API; and interact with the device as a Software-as-a-Service (SaaS) from the server using the first API.

17. The system of claim 16, wherein the server is part of a cloud processing environment having at least one additional server, and wherein the device is one of: a wearable processing device, a tablet, a phone, a laptop, and a computer-enabled device integrated into or affixed to a vehicle.

\* \* \* \* \*